United States Patent
Cho et al.

(10) Patent No.: US 11,745,882 B2
(45) Date of Patent: Sep. 5, 2023

(54) POWER MANAGEMENT SYSTEM FOR AIR MOBILITY VEHICLE AND OPERATION METHOD THEREOF

(71) Applicants: Hyundai Motor Company, Seoul (KR); Kia Corporation, Seoul (KR)

(72) Inventors: Hyun Ki Cho, Anyang-Si (KR); Hyun Woo Jun, Seoul (KR); Hee Kwang Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 166 days.

(21) Appl. No.: 17/382,703

(22) Filed: Jul. 22, 2021

(65) Prior Publication Data
US 2022/0204172 A1    Jun. 30, 2022

(30) Foreign Application Priority Data
Dec. 29, 2020 (KR) .......................... 10-2020-0186307

(51) Int. Cl.
*B64D 27/24* (2006.01)
*B60L 58/22* (2019.01)
(Continued)

(52) U.S. Cl.
CPC .............. *B64D 27/24* (2013.01); *B60L 58/19* (2019.02); *B60L 58/22* (2019.02); *B60L 58/14* (2019.02); *B60L 2200/10* (2013.01); *B60L 2240/10* (2013.01); *B60L 2240/42* (2013.01); *B64D 2221/00* (2013.01)

(58) Field of Classification Search
CPC ................ B64D 27/24; B64D 2221/00; B64D 2045/0085; B60L 58/19; B60L 58/22; B60L 58/14; B60L 2200/10; B60L 2240/10; B60L 2240/42; B60L 3/0092; B60L 58/12; B60L 58/21; B60L 2220/42; B60L 2240/545; B60L 3/0046; B60L 58/10; H02J 7/0013;
(Continued)

(56) References Cited

U.S. PATENT DOCUMENTS 7,433,794 B1   10/2008   Berdichevsky et al.
8,541,126 B2   10/2013   Hermann et al.
(Continued)

FOREIGN PATENT DOCUMENTS

| DE | 102013104322 A1 * | 12/2013 | ............ H02J 7/0016 |
| EP | 3521172 A1 * | 8/2019 | ............ B60L 50/40 |
| KR | 10-2013-0112732 | 10/2013 | |

OTHER PUBLICATIONS

Machine Translation of DE-102013104322-A9 (Year: 2014).*

*Primary Examiner* — M Baye Diao
(74) *Attorney, Agent, or Firm* — MORGAN, LEWIS & BOCKIUS LLP

(57) ABSTRACT

A power management system for an air mobility vehicle includes a plurality of batteries configured to provide power to a propulsion unit of the air mobility vehicle to propel the air mobility vehicle, and a discharge control unit configured to monitor an operation state and a charge state of each battery, determine a discharge mode of each of the plurality of batteries according to the monitored operation state and the monitored charge state, and control whether each of the plurality of batteries is discharged or a discharge rate thereof according to the determined discharge mode.

16 Claims, 3 Drawing Sheets

(51) Int. Cl.
*B60L 58/19* (2019.01)
*B60L 58/14* (2019.01)

(58) Field of Classification Search
CPC .. H02J 7/00306; H02J 7/0048; H02J 7/00712; Y02T 10/70; Y02T 10/7072; Y02T 50/60
USPC ........................................................ 320/132
See application file for complete search history.

(56) References Cited

U.S. PATENT DOCUMENTS

| | | | |
|---|---|---|---|
| 10,569,891 B2* | 2/2020 | Ferran | G01R 31/008 |
| 11,228,200 B2* | 1/2022 | Wang | H02J 7/34 |
| 2006/0102397 A1* | 5/2006 | Buck | H01M 8/04947 |
| | | | 429/432 |
| 2013/0201316 A1* | 8/2013 | Binder | H04L 67/12 |
| | | | 701/2 |
| 2020/0338989 A1* | 10/2020 | Zhang | B60L 3/0061 |
| 2021/0061110 A1* | 3/2021 | Orender | B64C 27/08 |
| 2021/0170908 A1* | 6/2021 | Villanueva | B64F 1/36 |
| 2021/0376402 A1* | 12/2021 | Tsuchiya | H02J 7/0048 |
| 2022/0185493 A1* | 6/2022 | Chen | G07C 5/0841 |
| 2022/0194616 A1* | 6/2022 | Kita | B64U 50/19 |

* cited by examiner

FIG. 2

| BATTERY DISCHARGE MODE | | BATTERY AVERAGE REMAINING CAPACITY | | | |
|---|---|---|---|---|---|
| | | 70% OR MORE | 40% OR MORE AND LESS THAN 70% | 10% OR MORE AND LESS THAN 40% | 10% OR LESS |
| AIRMOBILITY FLIGHT STATE | TAKING OFF | 2 PARALLEL DISCHARGE | 4 PARALLEL DISCHARGE | 4 PARALLEL DISCHARGE | 4 PARALLEL DISCHARGE |
| | ASCENDING | SINGLE DISCHARGE | 2 PARALLEL DISCHARGE | 2 PARALLEL DISCHARGE -OUTPUT LIMIT | 4 PARALLEL DISCHARGE |
| | CRUISING | SINGLE DISCHARGE | 2 PARALLEL DISCHARGE | 2 PARALLEL DISCHARGE -OUTPUT LIMIT | 4 PARALLEL DISCHARGE |
| | DESCENDING | SINGLE DISCHARGE | 2 PARALLEL DISCHARGE | 2 PARALLEL DISCHARGE -OUTPUT LIMIT | 4 PARALLEL DISCHARGE |
| | LANDING | 2 PARALLEL DISCHARGE | 4 PARALLEL DISCHARGE | 4 PARALLEL DISCHARGE | 4 PARALLEL DISCHARGE |

POWER MANAGEMENT SYSTEM FOR AIR MOBILITY VEHICLE AND OPERATION METHOD THEREOF

CROSS REFERENCE TO RELATED APPLICATION

The present application claims priority to Korean Patent Application No. 10-2020-0186307, filed Dec. 29, 2020, the entire contents of which is incorporated herein for all purposes by this reference.

BACKGROUND OF THE INVENTION

Field of the Invention

The present invention relates to a power management system for air mobility vehicle that, when a problem such as thermal runaway occurs in a plurality of batteries for supplying power to air mobility vehicles, prevents the transfer of thermal runaway around the batteries by discharging each battery, and an operation method thereof.

Description of Related Art

In recent years, while the battery-related industry is developing rapidly, there is also a demand for the development of a technology to prevent problems occurring in the battery. Batteries are widely used not only for an electric vehicle but also for air mobility vehicles such as a drone which flies in the air. Unlike a vehicle running on the ground, when a problem occurs with the battery of the air mobility vehicles, there is a risk of causing a major accident in the air.

As one of the problems that occur in the battery, there is a thermal runaway phenomenon that occurs in a lithium battery due to an increase in the temperature of the battery, and in general, when a battery is composed of a plurality of battery cells and thus thermal runaway occurs in one of the cells, the thermal runaway is transferred to the surrounding cells and the scale thereof becomes larger.

Among the existing technologies, there is a method for inhibiting or preventing the transfer of thermal runaway through a blocking membrane provided between respective cells or the like to prevent such a problem. However, when an air mobility vehicle aims for a lightweight airframe design, the additional blocking membrane is disadvantageous in terms of securing the energy density and the specific power, or the like. Therefore, it is desired to develop a technology that inhibits or prevents the transfer of thermal runaway in consideration of the power distribution of the battery rather than the structural aspect.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air mobility vehicles power management system that, when a problem such as thermal runaway occurs in a plurality of batteries for supplying power to air mobility vehicles, prevents the transfer of thermal runaway around the batteries by discharging each battery according to a discharge mode by flight status, and an operation method thereof.

In an exemplary embodiment of the present invention, a power management system for air mobility vehicle includes: a plurality of batteries configured to provide power to a propulsion unit of propelling an air mobility vehicle, and a discharge control unit configured to monitor an operation state and a charge state of each battery, determine a discharge mode of each of the plurality of batteries according to the monitored operation state and the monitored charge state, and control whether each of the plurality of batteries is discharged or a discharge rate thereof according to the determined discharge mode.

The operation state of the battery may include whether the battery is in a normal state or a fault state, and the charge state of the battery may include a remaining capacity of each battery and an average remaining capacity of all batteries.

The discharge mode of the battery may include a single discharge mode, a parallel discharge mode, or an output limit mode, and the discharge control unit may determine the discharge mode of each of the plurality of batteries considering a flight status of the air mobility vehicle.

The flight status of the air mobility vehicle may include whether the air mobility vehicle takes off, ascends, cruises, descends, or lands.

The discharge control unit may control whether each of the plurality of batteries is discharged or a discharge rate thereof by setting an output of the propulsion unit according to the determined discharge mode and selecting a battery among the plurality of batteries to provide power to the propulsion unit according to the set output.

The discharge control unit may determine the discharge current and a discharge time of each battery and control the discharge rate of each battery according to the discharge current and the discharge time.

The discharge control unit may perform discharging of a battery to be discharged by controlling whether each of the plurality of batteries is discharged or the discharge rate thereof, wherein the discharge control unit stops discharging the battery to be discharged when a charge state of the battery to be discharged is equal to or less than a predetermined reference.

The power management system may further include a discharge guide unit configured to guide information on the determined discharge mode to a user when the discharge mode of each of the plurality of batteries is determined by the discharge control unit.

In an exemplary embodiment of the present invention, an operation method of a power management system for air mobility vehicle includes: a monitoring step of monitoring an operation state and a charge state of each battery, a determining step of determining a discharge mode of each of the plurality of batteries according to the operation state and the charge state of each battery, and a control step of controlling whether each battery is discharged or a discharge rate thereof according to the determined discharge mode.

The operation method of a power management system for air mobility vehicle may further include a guide step of guiding information on the determined discharge mode to a user, after the determining step.

The operation method of a power management system for air mobility vehicle may further include a performing step of performing discharge of the battery to be discharged according to whether each battery is discharged or a discharge rate thereof, after the control step.

The operation method of a power management system for air mobility vehicle may further include a stopping step of stopping discharging the battery to be discharged when the charge state of the battery to be discharged is equal to or less than a predetermined reference, after the performing step.

According to the air mobility vehicle power management system and the operation method thereof in the present invention, when a problem such as thermal runaway occurs in a plurality of batteries for supplying power to air mobility vehicle, the transfer of thermal runaway around the batteries may be prevented by discharging each battery according to the discharge mode by flight status.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a diagram illustrating a discharge mode of a battery according to a flight state of an air mobility vehicle in the power management system according to an exemplary embodiment of the present invention.

Figure 1:
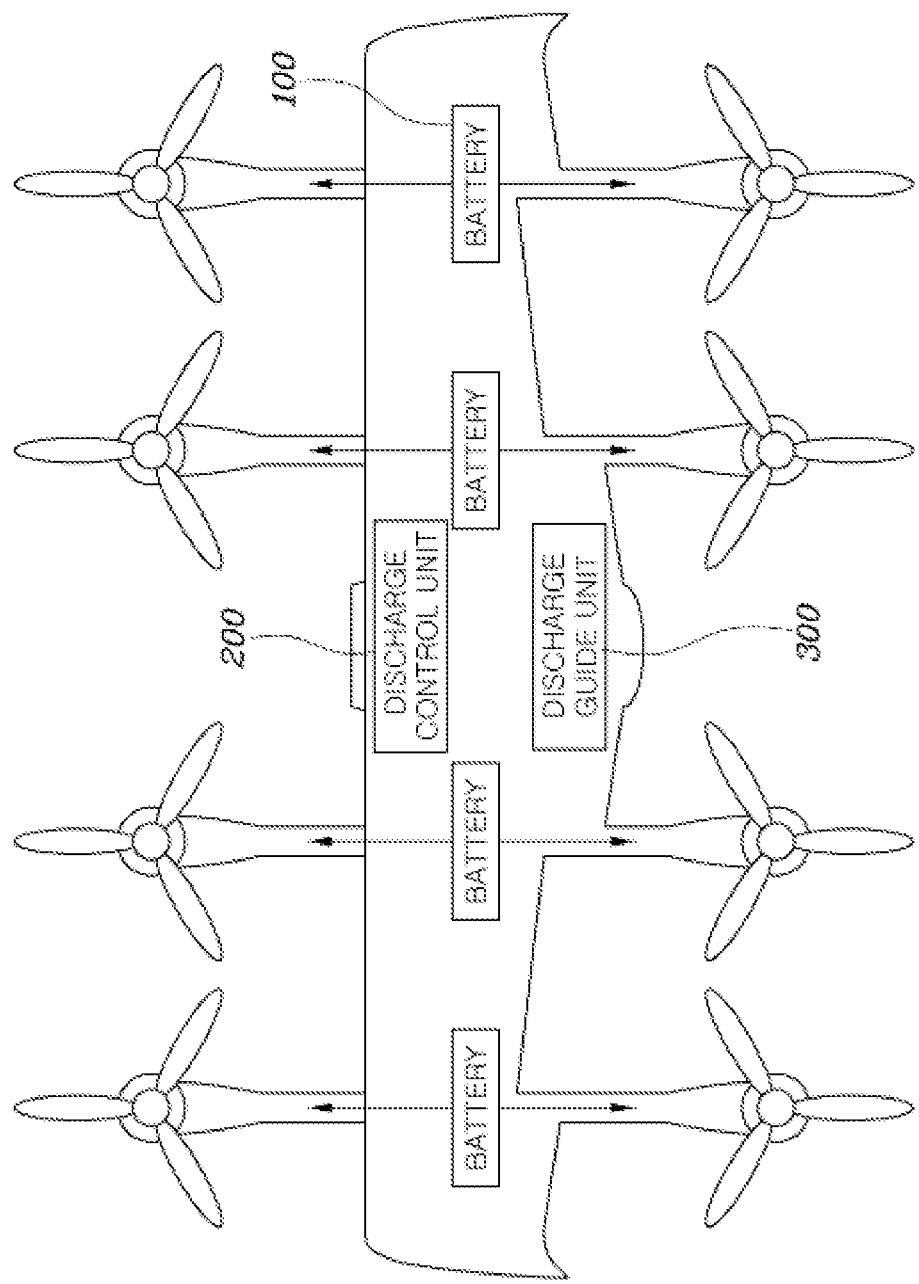
FIG. 1 is a diagram illustrating a power management system for air mobility according to an exemplary embodiment of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 3:
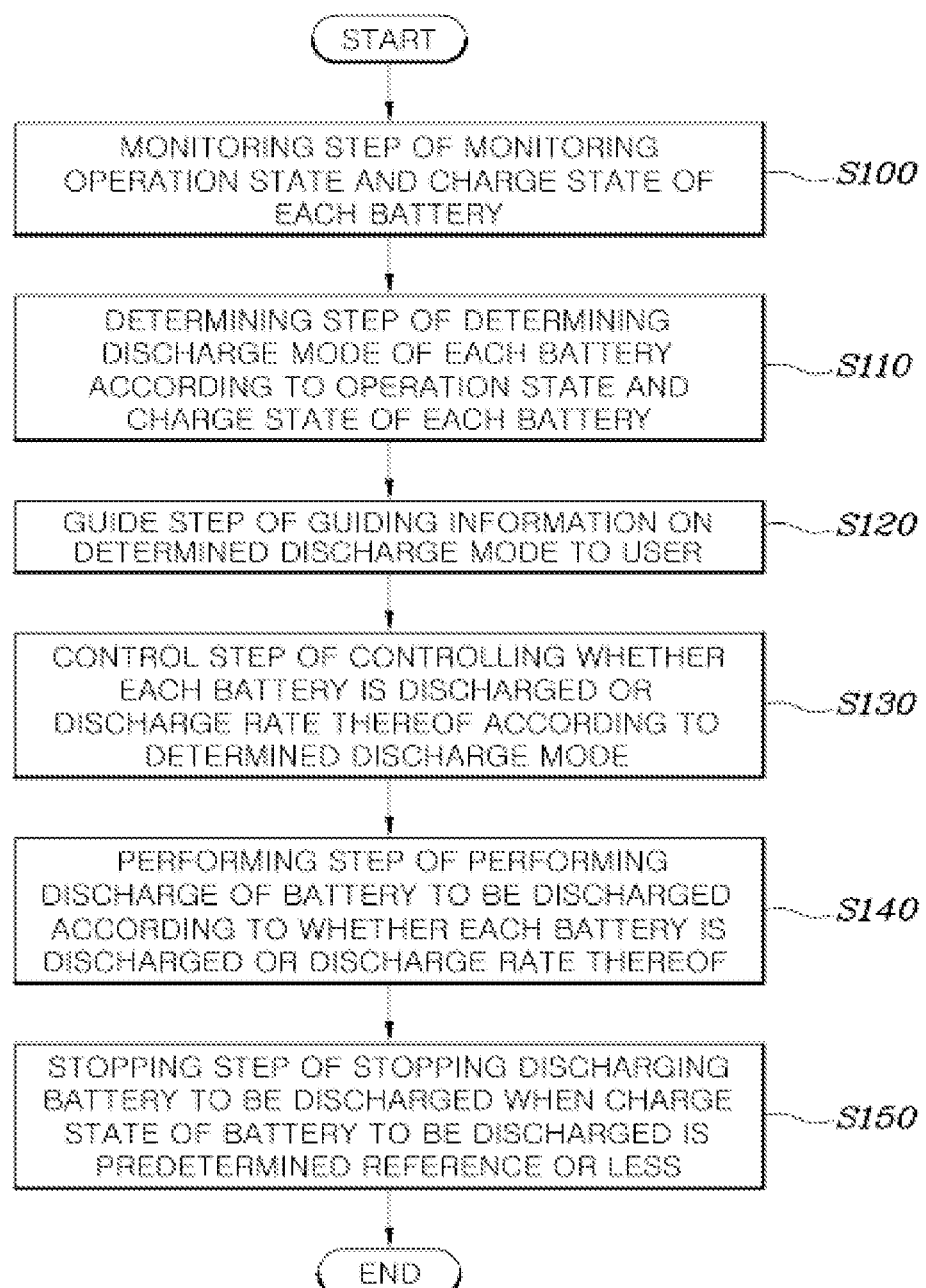
FIG. 3 is a flow chart illustrating an operation method of the power management system for air mobility according to an exemplary embodiment of the present invention.

FIG. 1 is a diagram illustrating a power management system for air mobility vehicle according to an exemplary embodiment of the present invention. FIG. 2 is a diagram illustrating a discharge mode of a battery according to a flight state of the air mobility vehicle in the power management system according to an exemplary embodiment of the present invention. FIG. 3 is a flow chart illustrating an operation method of the power management system for air mobility vehicle according to an exemplary embodiment of the present invention.

A discharge control unit 200 or a discharge guide unit 300 according to an exemplary form of the present invention may be implemented through a non-volatile memory configured to store an algorithm configured to control operations of various components of a vehicle or data relating to software instructions reproducing the algorithm and a processor configured to perform the operations described below using the data stored in the corresponding memory. Here, the memory and the processor may be implemented as separate chips. Alternatively, the memory and processor may be implemented as a single chip integrated with each other, and the processor may take the form of one or more processors.

FIG. 1 is a diagram illustrating a power management system for air mobility (e.g., an air mobility vehicle) according to an exemplary embodiment of the present invention. The power management system includes: a plurality of batteries 100 that provides power to a propulsion unit of the air mobility vehicle to propel the air mobility vehicle; and a discharge control unit 200 that monitors an operation state and a charge state of each battery 100, determines a discharge mode of each battery 100 according to the operation state and a charge state, and controls whether each battery 100 is discharged or a discharge rate thereof according to the determined discharge mode.

In the air mobility vehicle, a plurality of propulsion units, that is, propellers, are provided to propel the air mobility such as an air mobility vehicle, and the plurality of batteries 100 are connected in parallel to provide power to each propulsion unit. At the instant time, when thermal runaway occurs in any one battery 100 of the plurality of batteries 100, the thermal runaway may be transferred to the surrounding battery 100 in normal operation, increasing the scale of the thermal runaway. When thermal runaway occurs in the battery 100, the maximum temperature increase amount, a toxic gas discharge amount, thermal power, explosive power, or the like increase as the energy charge amount of the battery 100 increases, so an object of the power management system in an exemplary embodiment of the present invention is to reduce or minimize damage caused by thermal runaway by rapidly discharging energy of surrounding battery cells and battery cell modules even if thermal runaway occurs in a single battery cell.

Furthermore, when the air mobility vehicle is flying in the air, even if a problem occurs in the battery 100, fault tolerance control to safely land the air mobility vehicle is essential, so that the power management system according to an exemplary embodiment of the present invention instantaneously discharges the energy from the failed battery 100 in which thermal runaway has occurred by use of the power of a plurality of propellers, and at the same time, provides an output for stably controlling the air mobility vehicle. This can help design a lightweight airframe since, due to the nature of the distributed propulsion system including a plurality of propulsion units in the air mobility vehicle, it is easier to discharge the energy of some battery cells or battery modules instantaneously compared to systems such as ground mobility, and the existing blocking structure used, or the like to prevent thermal runaway is unnecessary.

Meanwhile, in the power management system for the air mobility vehicle according to an exemplary embodiment of the present invention, the operation state of the battery 100 includes whether the battery 100 is in a normal state or a fault state, and the charge state of the battery 100 may include the remaining capacity of each battery 100 and the average remaining capacity of all batteries 100.

The air mobility (e.g., the air mobility vehicle) to which the power management system applies may include a plurality of propulsion units including an inverter, a motor, and a propeller, a plurality of batteries 100, and a power divider provided in each battery 100. The discharge control unit 200 may control whether each battery 100 is discharged or a discharge rate thereof through the power divider.

Furthermore, when the battery 100 in which thermal runaway has occurred is detected through the operation state of the battery 100, the discharge control unit 200 may determine the discharge mode of each of the plurality of batteries after determining which battery 100 connects with the propulsion unit, how much discharge amount is appropriate, and how much discharge current is appropriate during discharge, based on the remaining capacity of the battery 100 in which thermal runaway has occurred and the battery 100 in normal operation, and the average remaining capacity of all batteries 100 and perform the discharges of the battery according to the corresponding discharge mode.

FIG. 2 is a diagram illustrating a discharge mode of a battery according to a flight state of an air mobility vehicle in the power management system according to an exemplary embodiment of the present invention. In the power management system according to an exemplary embodiment of the present invention, the discharge mode of the battery 100 includes a single discharge mode, a parallel discharge mode, or an output limit mode, and the discharge control unit 200 may determine the discharge mode of each of the plurality of batteries 100 considering the flight state of the air mobility vehicle. The flight status of the air mobility vehicle may include taking off, ascending, cruising, descending, or landing of the air mobility vehicle.

Since the output of the propulsion unit and the desired power to be supplied to the propulsion unit vary according to the flight state of the air mobility vehicle, according to this, the discharging method, that is, the discharging mode, has to be changed even if the discharge of the battery 100 is performed. Referring to FIG. 2, the discharge mode is different for each flight state and the average remaining capacity of the battery 100. The discharge mode includes a single discharge mode, a 2 parallel discharge mode, 2 parallel discharge mode and output limit, and a 4 parallel discharge.

Furthermore, the single discharge mode is a mode which provides power to the propulsion unit by use of only the battery 100 in which thermal runaway has occurred by opening all normal operating batteries 100 from the load, and according to this, in which the battery 100 in which thermal runaway has occurred is discharged at a high speed, and is used when the average remaining capacity of the battery 100 is 70% or more, at the time of ascending, cruising, or descending of the air mobility vehicle. This is because when the average remaining capacity of the battery 200 is high, the battery has to be discharged at a high speed at the time of occurring thermal runaway.

The 2 parallel discharge mode is a mode in which the discharge rate of the battery 100 in which thermal runaway occurs decreases compared to the single discharge mode by operating the propulsion unit while using a normal operating battery at a position symmetrical to the battery 100 in which thermal runaway occurs in parallel and is used when the average remaining capacity of the battery 100 is 70% or more at the time of taking off or landing of the air mobility vehicle, or when the average remaining capacity of the battery 100 is 40% to 70%, at the time of ascending, cruising, or descending of the air mobility vehicle. Since the output of the propulsion unit is large at the time of taking off or landing of the air mobility vehicle, or the average remaining capacity of the battery 100 is small, at the time of ascending, cruising, or descending of the air mobility vehicle, the discharge rate decreases compared to the single discharge mode to maintain the output to some extent and to efficiently discharge the thermal runaway battery 100.

The 2 parallel discharge mode and output limit is a mode to discharge by limiting the output current discharged in the 2 parallel discharge mode and is used when the average remaining capacity of the battery 100 is 10% to 40%, at the time of ascending, cruising, or descending of the air mobility vehicle. The power of the propulsion unit is lower at the time of ascending, cruising, or descending of the air mobility vehicle than at the time of taking off or landing of the air mobility vehicle, in which when the average remaining capacity of the battery 100 is insufficient, the discharge current is limited to more decrease the discharge rate than the 2 parallel discharge mode to maintain the desired output and to control the airframe safely and longer.

The 4 parallel discharge mode is a mode in which four batteries 100 are connected in parallel and dissipate current to discharge as before the thermal runaway occurs, even if thermal runaway of the battery 100 occurs, and is used when the average remaining capacity of the battery 100 decreases below 10% or when the average remaining capacity of the battery 100 is 70% or less at the time of taking off or landing of the air mobility vehicle. Since the high output is desired at the time of taking off or landing of the air mobility vehicle, since when the average remaining capacity of the battery 100 is 10% or less, the power desired for flight is very insufficient, or since when the average remaining capacity of the battery 100 is small, even if the thermal runaway occurs, the scale and damage of the thermal runaway will be very small, the present mode is that a plurality of batteries 100 are connected in parallel as they are to maintain the output and prevent excessive battery 100 consumption.

Meanwhile, in the power management system for air mobility vehicle according to an exemplary embodiment of the present invention, the discharge control unit 200 sets the output of the propulsion unit according to the determined discharge mode and selects a battery 100 of the plurality of batteries 100, that powers the propulsion unit according to the set output, and thus can control whether each battery 100 is discharged or a discharge rate thereof. The discharge control unit 200 may determine a discharge current and a discharge time of each battery 100 and control a discharge rate of each battery 100 according to the discharge current and the discharge time.

Furthermore, in the power management system for the air mobility vehicle according to an exemplary embodiment of the present invention, the discharge control unit 200 performs discharging of the battery 100 to be discharged by controlling whether each battery 100 is discharged or a discharge rate thereof, in which when the charge state of the battery 100 to be discharged is a predetermined reference or less, the discharge control unit may stop discharging the battery 100 to be discharged.

Since the discharge current and the discharge time of the battery 100 vary according to each discharge mode, the discharge control unit 200 determines the discharge current and the discharge time of the battery 100 according to each discharge mode, and thus by controlling the discharge rate of the battery 100 according to each discharge mode, determines the output, the flight time, and the like according to each flight state of the air mobility vehicle and the average remaining capacity of the battery 100 so that the air mobility vehicle can safely fly, take off, or land.

Furthermore, the discharge control unit 200 ends the forced discharge when the average remaining capacity of the battery 100 to be discharged is 10% or less, in which, in the instant case, because the possibility of transfer of thermal runaway or damage due to thermal runaway is small and the fault tolerance control is desired so that the air mobility vehicle can safely land using the remaining capacity of the battery 100. At the instant time, since the discharge control unit 200 may not be configured for measuring the voltage of each battery cell due to ignition of the thermal runaway battery, or the like, the average remaining capacity of the battery 100 is determined by accumulating the discharge current at a position spaced from each battery 100.

Meanwhile, when the discharge mode of each of the plurality of batteries 100 is determined by the discharge control unit 200, the power management system for the air mobility vehicle according to an exemplary embodiment of the present invention may further include a discharge guide unit 300 for guiding information on the determined discharge mode to the user-300. When a problem such as thermal runaway occurs in the battery 100, the discharge guide unit 300 guides the discharge mode to the user so that the user is aware of the situation, the user cooperates with the safety control of air mobility vehicle, and thus the air mobility vehicle can safely fly, take off, and land.

FIG. 3 is a flow chart illustrating an operation method of the power management system for the air mobility vehicle according to an exemplary embodiment of the present invention. The operation method of a power management system in an exemplary embodiment of the present invention includes: a monitoring step S100 of monitoring an operation state and a charge state of each battery; a determining step S110 of determining a discharge mode of each of the plurality of batteries according to the operation state and the charge state of each battery, and a control step S130 of controlling whether each battery is discharged or a discharge rate thereof according to the determined discharge mode.

Furthermore, the operation method of the power management system for the air mobility vehicle according to an exemplary embodiment of the present invention may further include a guide step S120 of guiding information on the determined discharge mode to a user, after the determining step S110.

Meanwhile, the operation method of the power management system for the air mobility vehicle according to an exemplary embodiment of the present invention may further include a performing step S140 of performing the discharge of the battery to be discharged according to whether each battery is discharged or a discharge rate thereof, after the control step S130.

Furthermore, the operation method of the power management system according to an exemplary embodiment of the present invention may further include a stopping step S150 of stopping the discharge the battery to be discharged, when the charge state of the battery to be discharged is equal to or less than a predetermined reference, after the performing step S140.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A power management system for an air mobility vehicle, the power management system comprising:
a plurality of batteries configured to provide power to a propulsion unit of the air mobility vehicle to propel the air mobility vehicle;
a discharge control unit configured to monitor an operation state and a charge state of each of the plurality of batteries, to determine a discharge mode of each of the plurality of batteries according to the monitored operation state and the monitored charge state, and control whether each of the plurality of batteries is discharged or a discharge rate thereof according to the determined discharge mode; and
a discharge guide unit configured to guide information on the determined discharge mode to a user when the discharge mode of each of the plurality of batteries is determined by the discharge control unit.

2. The power management system of claim 1,
wherein the operation state of each of the plurality of batteries includes whether each of the plurality of batteries is in a normal state or a fault state, and
wherein the charge state of each of the plurality of batteries includes a remaining capacity of each of the plurality of batteries and an average remaining capacity of all of the plurality of batteries.

3. The power management system of claim 1,
wherein the discharge mode of each of the plurality of batteries includes a single discharge mode, a parallel discharge mode, or an output limit mode, and
wherein the discharge control unit is configured to determine the discharge mode of each of the plurality of batteries considering a flight status of the air mobility vehicle.

4. The power management system of claim 3, wherein the flight status of the air mobility vehicle includes taking off, ascending, cruising, descending, or landing of the air mobility vehicle.

5. The power management system of claim 1, wherein the discharge control unit is configured for controlling whether each of the plurality of batteries is discharged or the discharge rate thereof by setting an output of the propulsion unit according to the determined discharge mode and selecting a battery among the plurality of batteries to provide power to the propulsion unit according to the set output.

6. The power management system of claim 5,
wherein the discharge mode of each of the plurality of batteries includes a single discharge mode, a parallel discharge mode, or an output limit mode,
wherein the discharge control unit is configured to determine the discharge mode of each of the plurality of batteries considering a flight status of the air mobility vehicle,
wherein the flight status of the air mobility vehicle includes taking off, ascending, cruising, descending, or landing of the air mobility vehicle, and
wherein the single discharge mode, the parallel discharge mode, and the output limit mode are determined according to a remaining capacity of the selected battery.

7. The power management system of claim 1, wherein the discharge control unit is configured to determine a discharge current and a discharge time of each of the plurality of batteries and is configured to control the discharge rate of each of the plurality of batteries according to the determined discharge current and the determined discharge time.

8. The power management system of claim 1,
wherein the discharge control unit is configured to perform discharging of a battery to be discharged by controlling whether each of the plurality of batteries is discharged or the discharge rate thereof, and
wherein the discharge control unit stops discharging the battery to be discharged when a charge state of the battery to be discharged is equal to or less than a predetermined reference.

9. A method of operating a power management system for an air mobility vehicle, the method comprising:
monitoring, by a discharge control unit, an operation state and a charge state of each of a plurality of batteries;
determining, by the discharge control unit, a discharge mode of each of the plurality of batteries according to the determined operation state and the determined charge state of each of the plurality of batteries;
controlling, by the discharge control unit, whether each of the plurality of batteries is discharged or a discharge rate thereof according to the determined discharge mode; and
guiding, by a discharge guide unit, information on the determined discharge mode to a user, when the discharge mode of each of the plurality of batteries is determined.

10. The method of claim 9,
wherein the operation state of each of the plurality of batteries includes whether each of the plurality of batteries is in a normal state or a fault state, and
wherein the charge state of each of the plurality of batteries includes a remaining capacity of each of the plurality of batteries and an average remaining capacity of all of the plurality of batteries.

11. The method of claim 9,
wherein the discharge mode of each of the plurality of batteries includes a single discharge mode, a parallel discharge mode, or an output limit mode, and
wherein the discharge control unit is configured to determine the discharge mode of each of the plurality of batteries considering a flight status of the air mobility vehicle.

12. The method of claim 11, wherein the flight status of the air mobility vehicle includes taking off, ascending, cruising, descending, or landing of the air mobility vehicle.

13. The method of claim 9, further including:
performing, by the discharge control unit, discharge of a battery to be discharged according to whether each of the plurality of batteries is discharged or the discharge rate thereof, after the controlling whether each of the plurality of batteries is discharged or the discharge rate thereof according to the determined discharge mode.

14. The method of claim 13,
wherein the discharge mode of each of the plurality of batteries includes a single discharge mode, a parallel discharge mode, or an output limit mode,
wherein the discharge control unit is configured to determine the discharge mode of each of the plurality of batteries considering a flight status of the air mobility vehicle,
wherein the flight status of the air mobility vehicle includes taking off, ascending, cruising, descending, or landing of the air mobility vehicle, and
wherein the single discharge mode, the parallel discharge mode, and the output limit mode are determined according to a remaining capacity of the battery.

15. The method of claim 13, further including:
stopping, by the discharge control unit, discharging the battery to be discharged when a charge state of the battery to be discharged is equal to or less than a predetermined reference, after the performing discharge of the battery to be discharged.

16. A non-transitory computer readable storage medium on which a program for performing the method of claim 9 is recorded.

* * * * *